(12) United States Patent
Sangameshwara et al.

(10) Patent No.: US 12,388,929 B2
(45) Date of Patent: Aug. 12, 2025

(54) METHOD AND SYSTEM FOR HANDLING FUNCTIONAL ALIAS IN CONFERENCE EVENT PACKAGE

(71) Applicant: Samsung Electronics Co., Ltd., Suwon-si (KR)

(72) Inventors: Vijay Sangameshwara, Bangalore (IN); Kiran Gurudev Kapale, Bangalore (IN); Arunprasath Ramamoorthy, Bangalore (IN); Bhargav Madishetty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 17/936,717

(22) Filed: Sep. 29, 2022

(65) Prior Publication Data

US 2023/0097919 A1 Mar. 30, 2023

(30) Foreign Application Priority Data

Sep. 29, 2021 (IN) .............................. 202141044104
Jul. 15, 2022 (IN) .............................. 202141044104

(51) Int. Cl.
*H04L 12/66* (2006.01)
*H04L 65/1045* (2022.01)
(Continued)

(52) U.S. Cl.
CPC .......... *H04M 3/56* (2013.01); *H04L 65/1045* (2022.05)

(58) Field of Classification Search
CPC .......... H04W 4/10; H04W 4/06; H04W 76/45; H04W 88/02; H04W 4/08; H04W 76/40;
(Continued)

(56) References Cited

U.S. PATENT DOCUMENTS 10,064,020 B2 8/2018 Pattan et al.
2006/0046758 A1* 3/2006 Emami-Nouri ..... H04L 65/4061
455/518
(Continued)

FOREIGN PATENT DOCUMENTS

CN 111726762 A 9/2020

OTHER PUBLICATIONS

International Search Report and Written Opinion of the International Searching Authority dated Dec. 28, 2022, in connection with International Application No. PCT/KR2022/014676, 7 pages.

(Continued)

*Primary Examiner* — Kharye Pope

(57) ABSTRACT

The disclosure relates to a 5G or 6G communication system for supporting a higher data transmission rate. Embodiments herein provide a method for handling functional alias in a conference event package in a wireless network by a server. The method includes detecting a group call associated with a group in the wireless network. Further, the method includes providing a SIP NOTIFY message comprising an ID of each member of a plurality of members of the group, and an IE indicating the functional alias bound by each member of the plurality of members with the group. Further, the method includes sending the SIP NOTIFY message to a client device corresponding to each member of the plurality of members of the group.

16 Claims, 12 Drawing Sheets

(51) Int. Cl.
*H04M 3/00* (2024.01)
*H04M 3/56* (2006.01)
*H04M 5/00* (2006.01)

(58) Field of Classification Search
CPC ... H04W 12/37; H04W 76/10; H04W 84/042; H04L 65/4061; H04L 65/1016; H04L 12/189; H04L 65/4038; H04L 2101/395; H04L 61/50; H04L 61/4588; H04L 65/1104; H04L 65/1069; H04L 63/205; H04L 65/611; H04M 15/57; H04M 15/63
See application file for complete search history.

(56) References Cited

U.S. PATENT DOCUMENTS

| | | | | |
|---|---|---|---|---|
| 2008/0084832 | A1* | 4/2008 | Haruna | H04L 12/1818 370/260 |
| 2008/0226051 | A1* | 9/2008 | Srinivasan | H04M 3/567 379/202.01 |
| 2011/0092172 | A1* | 4/2011 | Stille | H04W 76/45 455/90.2 |
| 2011/0219117 | A1* | 9/2011 | Linder | H04L 65/10 709/224 |
| 2013/0066974 | A1* | 3/2013 | Yoakum | H04L 12/1827 709/205 |
| 2018/0131730 | A1* | 5/2018 | Leis | H04L 65/1016 |
| 2019/0335328 | A1* | 10/2019 | Ben Henda | H04W 12/04 |
| 2020/0153838 | A1* | 5/2020 | Ge | H04L 67/306 |
| 2023/0055014 | A1* | 2/2023 | Leis | H04W 4/10 |

OTHER PUBLICATIONS

3GPP TS 23.379 V17.8.0 (Sep. 2021), Technical Specification, 3rd Generation Partnership Project; Technical Specification Group Services and System Aspects; Functional architecture and information flows to support Mission Critical Push To Talk (MCPTT); Stage 2 (Release 17), Sep. 2021, 247 pages.
Nokia, et al., "FA indication in subscription request MCPTT_16," C1-213462, 3GPP TSG-CT-WG1 Meeting #130-e, Electronic meeting, May 20-28, 2021, 9 pages.
Nokia, et al., "Introduction of Functional alias(es)," S6-171755 (revision of S6-171590), 3GPP TSG-SA WG6 Meeting #20, Reno, USA, Nov. 27-Dec. 1, 2017, 16 pages.
3GPP TR 22.889 V17.3.0 (Sep. 2020), Technical Report, 3rd Generation Partnership Project; Technical Specification Group Services and System Aspects; Study on Future Railway Mobile Communication System; Stage 1 (Release 17), Sep. 2020, 257 pages.
3GPP TS 22.179 V17.1.0 (Mar. 2022), Technical Specification, 3rd Generation Partnership Project; Technical Specification Group Services and System Aspects; Mission Critical Push To Talk (MCPTT); Stage 1 (Release 17), Mar. 2022, 88 pages.
3GPP TS 22.281 V17.0.0 (Mar. 2022), Technical Specification, 3rd Generation Partnership Project; Technical Specification Group Services and System Aspects; Mission Critical Video services (Release 17), Mar. 2022, 31 pages.
3GPP TS 24.281 V17.5.0 (Dec. 2021), Technical Specification, 3rd Generation Partnership Project; Technical Specification Group Core Network and Terminals; Mission Critical Video (MCVideo) signalling control; Protocol specification (Release 17), Dec. 2021, 511 pages.
3GPP TS 24.379 V17.5.0 (Dec. 2021), Technical Specification, 3rd Generation Partnership Project; Technical Specification Group Core Network and Terminals; Mission Critical Push To Talk (MCPTT) call control; Protocol specification (Release 17), Dec. 2021, 685 pages.
Samsung, "Inclusion of functional alias in conference event package notification—mcvideo," C1-216072 was C1-215950, 3GPP TSG-CT WG1 Meeting #132-e, E-meeting, Oct. 11-15, 2021, 5 pages.
Samsung, "Inclusion of functional alias in conference event package notification—mcptt," C1-21073 was C1-215951, 3GPP TSG-CT WG1 Meeting #132-e, E-meeting, Oct. 11-15, 2021, 5 pages.
Supplementary European Search Report dated Nov. 26, 2024, in connection with European Patent Application No. 22876909.7, 11 pages.
Roach, "Session Initiation Protocol (SIP)—Specific Event Notification," Jun. 2002, 39 pages.
Rosenberg et al., " A Session Initiation Protocol (SIP) Event Package for Conference State," Aug. 2006, 48 pages.

* cited by examiner

| Current Conference Payload | Conference payload with proposed invention to MCX |
|---|---|
| SIP NOTIFY<br><br><conference-info entity="tel:82105000" state="full"><br><users><br><user entity=82105001 state="full"><br><endpoint entity="tel:+82105001"><br><status>connected</status><br></endpoint><br></user><br><user entity=82105002 state="full"><br><endpoint entity="tel:+82105002"><br><status>connected</status><br></endpoint><br><user><br><user entity=82105003 state="full"><br><endpoint entity="tel:+82105003"><br><status>connected</status><br></endpoint><br></user><br><user entity=82105004 state="full"><br><endpoint entity="tel:+82105004"><br><status>connected</status><br></endpoint><br></user><br></users><br></conference-info> | <? xml version = "1.0" encoding = "UTF-8"?><br><conference-info entity="tel:82105000" state="full"><br><users><br><user entity=82105001 state="full"<br><endpoint entity="tel:+82105001"><br><Functional-Alias>Police Technician</Functional-Alias><br><status>connected</status><br></endpoint><br></user><br><user entity=82105002 state="full"><br><endpoint entity="tel:+82105002"><br><Functional-Alias>Police Officer</Functional-Alias><br><status>connected</status><br></endpoint><br></user><br><user entity=82105003 state="full"><br><endpoint entity="tel:+82105003"><br><Functional-Alias>Deputy Policy Chief</Functinal-Alias><br><status>connected</status><br></endpoint><br></user><br><user entity=82105004 state="full"><br><endpoint entity="tel:+82105004><br><Functional-Alias>Police lieutenant</Functional-Alias><br><status>connected</status><br></endpoint><br></user><br></users><br></conference-info> |

FIG.7

| Current Conference Payload | Conference payload with proposed invention to MCX |
|---|---|
| SIP NOTIFY<br><br><conference-info entity="tel:82105000" state="full"><br><users><br><user entity=82105001 state="full"><br><endpoint entity="tel:+82105001"><br><status>connected</status><br></endpoint><br></user><br><user entity=82105002 state="full"><br><endpoint entity="tel:+82105002"><br><status>connected</status><br></endpoint><br><user><br><user entity=82105003 state="full"><br><endpoint entity="tel:+82105003"><br><status>connected</status><br></endpoint><br></user><br><user entity=82105004 state="full"><br><endpoint entity="tel:+82105004"><br><status>connected</status><br></endpoint><br></user><br></users><br></conference-info> | <? xml version = "1.0" encoding = "UTF-8"?><br><conference-info entity="tel:82105000" state="full"><br><users><br><user entity=82105001 state="full"<br><endpoint entity="tel:+82105001"><br><Alias>Dietician</Alias><br><status>connected</status><br></endpoint><br></user><br><user entity=82105002 state="full"><br><endpoint entity="tel:+82105002"><br></Alias>Pediatrist</Alias><br><status>connected</status><br></endpoint><br></user><br><user entity=82105003 state="full"><br><endpoint entity="tel:+82105003"><br></Alias>Patholgist</Alias><br><status>connected</status><br></endpoint><br></user><br><user entity=82105004 state="full"><br><endpoint entity="tel:+82105004><br></Alias>Physiotherapists</Alias><br><status>connected</status><br></endpoint><br></user><br></users><br></conference-info> |

FIG.8

METHOD AND SYSTEM FOR HANDLING FUNCTIONAL ALIAS IN CONFERENCE EVENT PACKAGE

CROSS-REFERENCE TO RELATED APPLICATIONS

This application is based on and claims priority under 35 U.S.C. § 119 to Indian Patent Application No. 202141044104, filed Sep. 29, 2021, and Indian Patent Application No. 202141044104, filed Jul. 15, 2022, both filed in the Indian Intellectual Property Office, the disclosures of which are incorporated by reference herein in their entirety.

BACKGROUND

1. Field

The present disclosure relates to a method and a system for handling Functional Alias in conference event package in a wireless network.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U)) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

OBJECT OF DISCLOSURE

The principal object of the embodiments herein is to provide a method and system for handling a functional alias in a conference event package in a wireless network. The provided method enables a server to share functional alias of group members in a conference notify as part of conference package, so that a client device processes the functional alias and render on a user interface (UI) of the client device. Thus, empowering end user to select apt user based on role when delegating tasks.

SUMMARY

Accordingly, the embodiment herein is to provide a method for handling functional alias in a conference event package in a wireless network. The method includes detecting, by a server, a group call associated with a group in the wireless network. Further, the method includes providing, by the server, a session initiation protocol (SIP) NOTIFY message comprising an identifier (ID) of each member of a plurality of members of the group, and an information element (IE) indicating the functional alias bound by each member of the plurality of members with the group. Further, the method includes sending, by the server, the SIP NOTIFY message to a client device corresponding to each member of the plurality of members of the group.

In an embodiment, further, the method includes determining, by the server, the functional alias bound to each member of the plurality of members in the group, wherein the functional alias is used by the members of the group to determine participants based on roles in the conference call.

In an embodiment, the wireless network is one of a 3rd generation partnership project (3GPP) mission critical services (MCX) network or a 3GPP IP multimedia subsystem (IMS) network.

In an embodiment, the server is one of a MCX server or an IMS server.

In an embodiment, the client device is one of a MCX client device or an IMS client device.

In an embodiment, the group call is one of a MCX group call and an IMS group call.

In an embodiment, the group call is one of a MCX group call comprising one of a mission-critical push-to-talk (MCPTT) group call, a mission-critical video (MCVideo) group Call, and a mission-critical data (MCData) group message conversation or an IMS group call comprising one of a voice group call, a video group call and a group message conversation.

Accordingly, the embodiment herein is to provide a method for handling functional alias in a conference event package in a wireless network group call. The method includes joining, by a client device in the wireless network, a conference call associated with a group in the wireless network. Further, the method includes receiving, by the client device, an SIP NOTIFY message associated with the group from a server in the wireless network, wherein the SIP NOTIFY message comprises the ID of each member of a plurality of members of the group, and an IE indicating functional alias bound by each member of the plurality of members with the group. Further, the method includes displaying, by the client device, a group user interface (UI) comprising the ID of each member of the plurality of members of the group, and functional alias bound by each member of the plurality of members with the group.

In an embodiment, further, the method allows the user on the client device to determine active participants in the conference call to whom a specific task needs to be delegated based on the displayed functional alias bound by each member of the plurality of members with the group. Further, the method allows the user on the client device to delegate the specific task to the active participants in the conference call.

Accordingly, the embodiment herein is to provide a server for handling functional alias in a conference event package in a wireless network. The server includes a memory comprising information of the conference event package, a processor coupled to the memory, and a functional alias manager communicatively coupled to the memory and the processor. The functional alias manager is configured to detect a group call associated with a group in the wireless network. The functional alias manager support a conference server to provide the functional alias of each member of a plurality of members of the group, so that the functional alias manager provides a SIP NOTIFY message comprising the ID of each member of a plurality of members of the group, and an IE indicating the functional alias bound by each member of the plurality of members with the group. The functional alias manager is configured to send the SIP NOTIFY message to a client device corresponding to each member of the plurality of members of the group.

Accordingly, the embodiment herein is to provide a client device for handling functional alias in a conference event. The client device includes a memory comprising information of the conference event package, a processor coupled to the memory, and a functional alias manager, communicatively coupled to the memory and the processor. The SIP NOTIFY message comprises the ID of each member of a plurality of members of the group, and an IE indicating functional alias bound by each member of the plurality of members with the group. The functional alias manager is configured to display a group UI comprising the ID of each member of the plurality of members of the group, and functional alias bound by each member of the plurality of members with the group.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which:

FIG. 7 illustrates a comparison of current conference package payload and conference package payload in SIP NOTIFY for 3GPP MCX according to various embodiments of the present disclosure;

FIG. 8 illustrates a comparison of current conference package payload and conference package payload in SIP NOTIFY for 3GPP IMS according to various embodiments;

DETAILED DESCRIPTION

Figure 1:
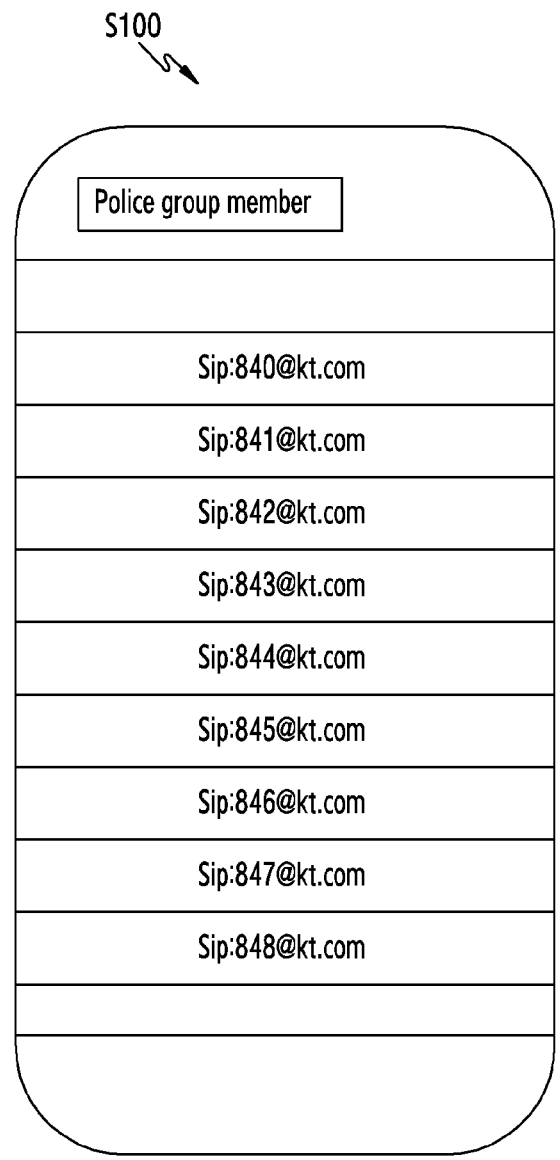
FIG. 1 illustrating a scenario of a MCX group call UI with current conference package payload enhancements.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In general, a mission critical (MCX) user is not able to identify "correct group member" while delegating task. Though, the MCX user(s) join groups by sharing their dedicated role (i.e., functional alias), a MCX server is not able to share the same to other group members as part of conference notification.

Thus, it is desired to address the above-mentioned disadvantages or other shortcomings or at least provide a useful alternative.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for handling functional alias in a conference event package in a wireless network. The method includes detecting, by a server, a group call associated with a group in the wireless network. Further, the method includes generating, by the server, a session initiation protocol (SIP) NOTIFY message comprising the ID of each member of a plurality of members of the group, and an information element (IE) indicating the functional alias bound by each member of the plurality of members with the group. Further, the method includes sending, by the server, the SIP NOTIFY message to a client device corresponding to each member of the plurality of members of the group.

The provided method enables the server to share the functional alias of group members in a conference NOTIFY as part of conference package, so that the client device processes the functional alias and render on UI, empowering end user to select apt user based on role when delegating tasks.

Referring now to the drawings and more particularly to FIGS. 2 through 10, where similar reference characters denote corresponding features consistently throughout the figures, there are shown preferred embodiments.

FIG. 1 illustrating an example scenario (S100) of MCX group call UI with current conference package payload enhancements.

Figure 2A:
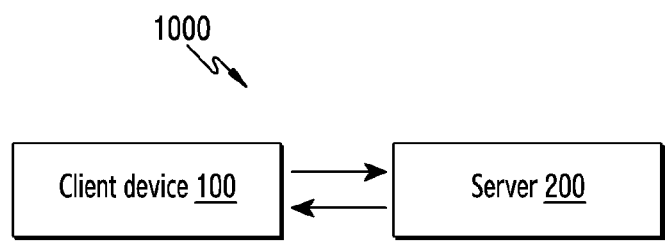
FIG. 2A illustrates a wireless network for handling functional alias in a conference event package according to various embodiments of the present disclosure.

FIG. 2A illustrates a wireless network (1000) for handling functional alias in a conference event package according to various embodiments of the present disclosure. The wireless network (1000) can be, for example, but not limited to a 3GPP MCX network or a 3GPP IMS network. The server (200) can be, for example, but not limited to a MCX server and an IMS server. The client device (100) can be, for example, but not limited to a MCX client device or an IMS client device.

The server (200) detects a group call associated with a group in the wireless network (1000) and generates a SIP NOTIFY message comprising an ID of each member of a plurality of members of the group, and an IE indicating the functional alias bound by each member of the plurality of members with the group. The group call is one of a MCX group call comprising one of a mission-critical push-to-talk (MCPTT) group call, a mission-critical video (MCVideo) group call, a mission-critical data (MCData) group message conversation or an IMS group call comprising one of a voice group call, a video group call and a group message conversation.

Further, the server (200) sends the SIP NOTIFY message to the client device (100) corresponding to each member of the plurality of members of the group. Further, the server (200) determines the functional alias of each member of the plurality of members in the group, wherein the functional alias is used by the members of the group to determine participants in the conference call.

Further, the client device (100) joins a conference call associated with a group in the wireless network (1000) and receives the SIP NOTIFY message associated with the group from the server (200) in the wireless network (1000). Further, the client device (100) displays a group user interface (UI) comprising the ID of each member of the plurality of members of the group, and functional alias bound by each member of the plurality of members with the group. The provided method empowers the user of the client device (10) to select apt group participant based on the functional alias when he/she wants to delegate the certain task in hand In an example, based on the provided method, the server (200) provides the conference event package with a "functional alias" message field for each participants (endpoint), leveraged by a 3GPP MCX server to share the functional alias as part of conference notification to participants and also extended to 3GPP IMS provided as "alias."

The proposal of "functional alias" message field to 3GPP 24.379 (Mission Critical Push To Talk (MCPTT) call control; Protocol specification) and 3GPP 24.281(Mission Critical Video (MCVideo) signalling control; Protocol specification) on top of Conference Event Package (RFC 4575) with below ABNF/syntax as child message node to endpoint message:

<xs:element name="functional-alias"type="xs:
    anyURI"minOccurs="0"maxOccurs="1"/>.

In an example, the functional alias extension is used to indicate per-user functional alias association with MCVideo group as shown in TABLE 1.

TABLE 1

Functional alias

<?xml version="1.0" encoding="UTF-8"?>
<xs:schema
targetNamespace="urn:3gpp:ns:mcvideoConfInfo:1.0"
xmlns:xs="http://www.w3.org/2001/XMLSchema"
xmlns:mcvideoConfInfo="urn:3gpp:ns:mcvideoConfInfo:1.0"
elementFormDefault="qualified" attributeFormDefault="unqualified">
<!--MCVideo specific child element of endpoint element -->
<xs:element name="functional-alias" type="xs:anyURI" use="optional"/>
    </xs:schema>

"""""""""""""""""""""""""""___""""""""""In an example, an MCPTT client device upon receiving a SIP NOTIFY request to the previously sent SIP SUBSCRIBE request:
  a. may handle the functional-alias information element if received in SIP NOTIFY request body for each user in their corresponding end-point message and associate as part of current state information.

When sending a conference event notification, the controlling MCPTT function:
  a. may generate a notification package as specified in subclause 6.3.3.4 to all MCPTT clients which have subscribed to the conference event package;
  b. may include functional alias information element of a participant in corresponding end-point message of the generated notification package, for those participants having active functional alias associated with this MCPTT group for which notification is generated; and
  c. may send a SIP NOTIFY request to all participants which have subscribed to the conference event packages specified in 3GPP TS 24.229.

When sending a conference event notification, the non-controlling MCPTT function:
  a. may generate a notification package as specified in 3GPP standard specification to all participants which have subscribed to the conference event package;
  b. may include functional alias information element of a participant in corresponding end-point message of the generated notification package, for those participants having active functional alias associated with this MCPTT group for which notification is generated; and
  c. may send a SIP NOTIFY request to all participants which have subscribed to the conference event packages specified in 3GPP TS 24.229.

Further, the MCVideo client device (100) upon receiving a SIP NOTIFY requests to the previously sent SIP SUBSCRIBE request:
  a. may handle the functional-alias information element if received in SIP NOTIFY request body for each user in their corresponding end-point message and associate as part of current state information.

When sending a conference event notification, the controlling MCVideo function:
a. may generate a notification package as specified in 3GPP standard specification to all MCVideo clients which have subscribed to the conference event package;
b. may include Functional Alias information element of a participant in corresponding end-point message of the generated notification package, for those participants having active Functional Alias associated with this MCVideo group for which notification is generated; and
c. may send a SIP NOTIFY request to all participants which have subscribed to the conference event packages specified in 3GPP TS 24.229.

When sending a conference event notification, the non-controlling MCVideo function:
a. may generate a notification package as specified in 3GPP standard specification to all participants which have subscribed to the conference event package;
b. may include functional alias information element of a participant in corresponding end-point message of the generated notification package, for those participants having active functional alias associated with this MCVideo group for which notification is generated; and
c. may send a SIP NOTIFY request to all participants which have subscribed to the conference event packages specified in 3GPP TS 24.229.

Further, the proposal of "alias" message field to 3GPP 24.229 (IP multimedia call control protocol based on Session Initiation Protocol [SIP] and Session Description Protocol [SDP]) on top of Conference Event Package (RFC 4575) with below ABNF/syntax as child message node to endpoint message:

```
<xs:element name="alias"type="xs:
    anyURI"minOccurs="0"maxOccurs="1"/>.
```

Figure 2B:
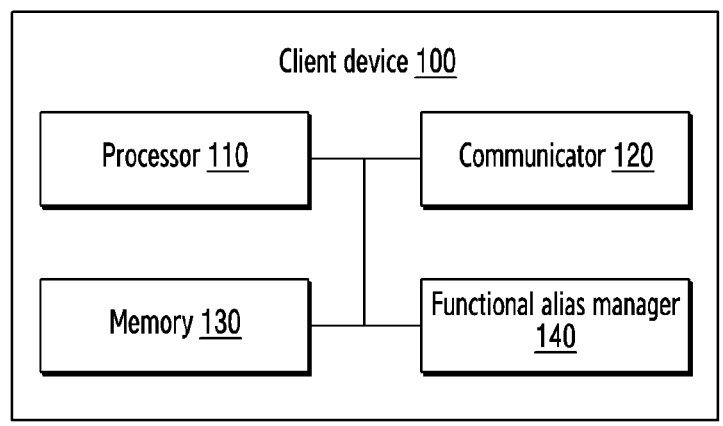
FIG. 2B illustrates various hardware components of a client device for handling functional alias in a conference event package in the wireless network according to various embodiments of the present disclosure.

FIG. 2B illustrates various hardware components of the client device (100) for handling functional alias in a conference event package in the wireless network (1000) according to various embodiments of the present disclosure. In an embodiment, the client device (100) includes a processor (110), a communicator (120), a memory (130) and a functional alias manager (140). The processor (110) is coupled with the communicator (120), the memory (130) and the functional alias manager (140).

The functional alias manager (140) manages the functional alias bound to each member of the plurality of members of the group received in SIP NOTIFY message associated with the group from the server (200) in the wireless network (1000). Further, the functional alias manager (140) displays the group UI comprising the ID of each member of the plurality of members of the group, and functional alias bound by each member of the plurality of members with the group.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110) and information of the conference event package. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 2B illustrates various hardware components of the client device (100) but it is to be understood that other embodiments are not limited thereon. In other embodiments, the client device (100) may include less or more number of components. Further, the labels or names of the components are used only for illustrative purpose and does not limit the scope of the present disclosure. One or more components can be combined together to perform same or substantially similar function in the client device (100).

Figure 2C:
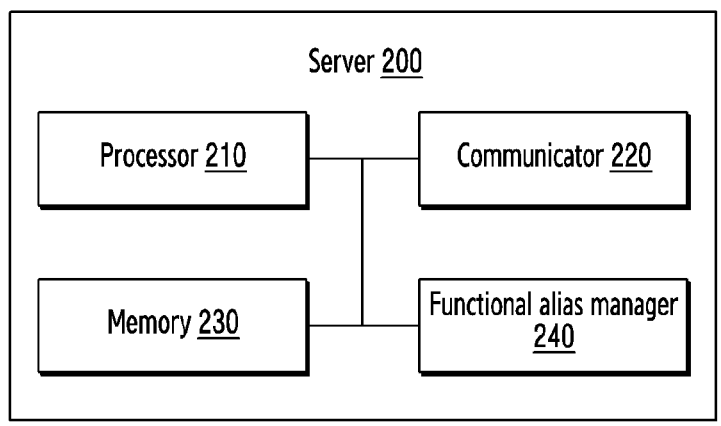
FIG. 2C illustrates various hardware components of a server for handling functional alias in a conference event package in a wireless network according to various embodiments of the present disclosure.

FIG. 2C illustrates various hardware components of the server (200) for handling functional alias in the conference event package in the wireless network (1000) according to various embodiments of the present disclosure. In an embodiment, the server (200) includes a processor (210), a communicator (220), a memory (230) and a functional alias manager (240). The processor (210) is coupled with the communicator (220), the memory (230) and the functional alias manager (240).

The functional alias manager (240) detects the group call associated with a group in the wireless network (1000) and assist the server by providing each member of a plurality of members of the group, and the IE indicating the functional alias bound by each member of the plurality of members with the group. Further, the server sends the SIP NOTIFY message to the client device (100) corresponding to each member of the plurality of members of the group. The functional alias manager (240) determines the functional alias of each member of the plurality of members in the group, wherein the functional alias is used by the members of the group to determine participants in the conference call.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210) and information of the conference event package. The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in random access memory (RAM) or cache).

Although the FIG. 2C illustrates various hardware components of the server (200) but it is to be understood that other embodiments are not limited thereon. In other embodiments, the server (200) may include less or more number of components. Further, the labels or names of the components are used only for illustrative purpose and does not limit the scope of the present disclosure. One or more components can be combined together to perform same or substantially similar function in the server (200).

Figure 3:
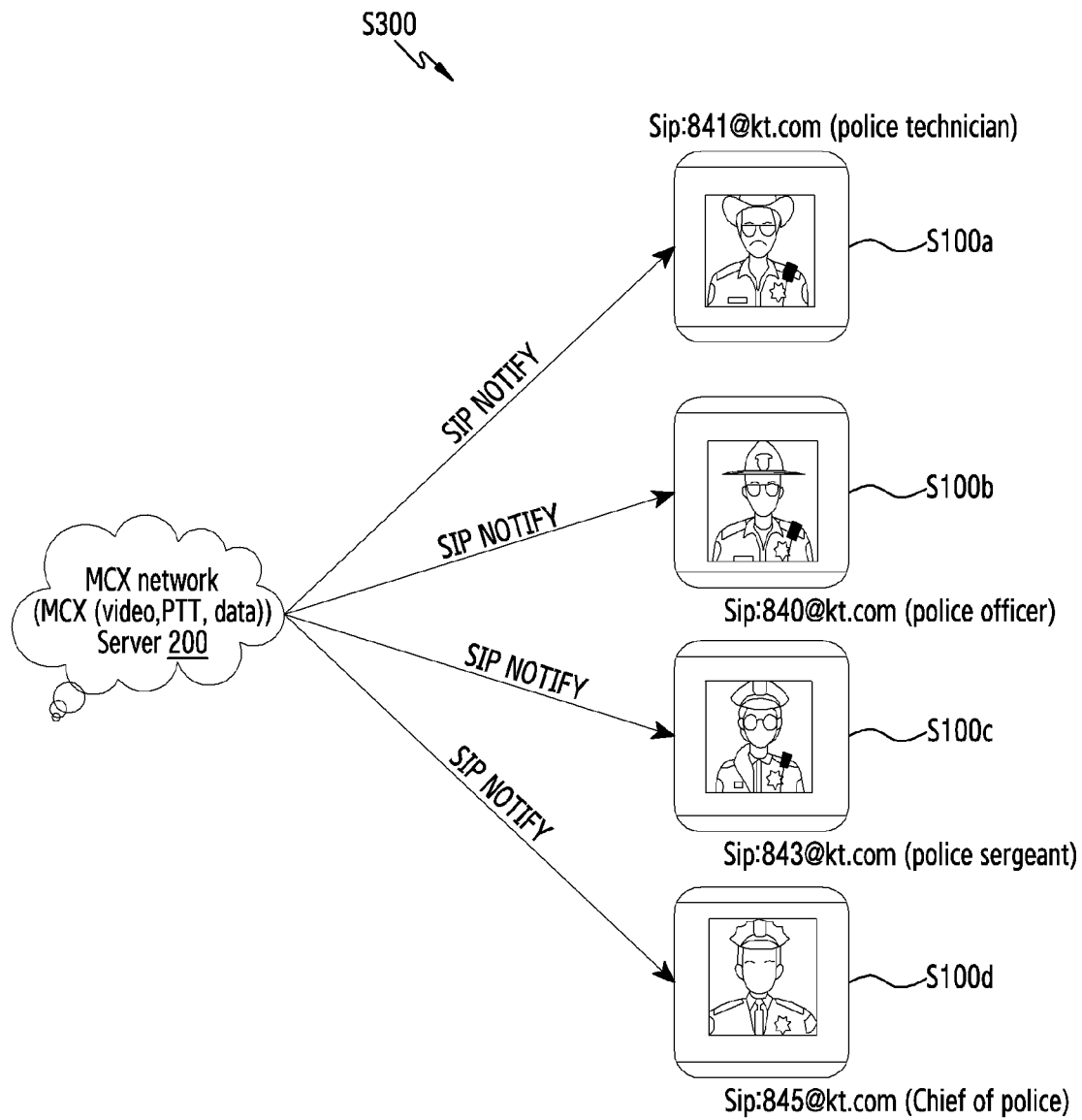
FIG. 3 illustrating illustrates example scenario of call flow for SIP NOTIFY for conference event according to various embodiments of the present disclosure.

FIG. 3 illustrates an example scenario (S300) of call flow for SIP NOTIFY for conference event according to various embodiments of the present disclosure.

Figure 4:
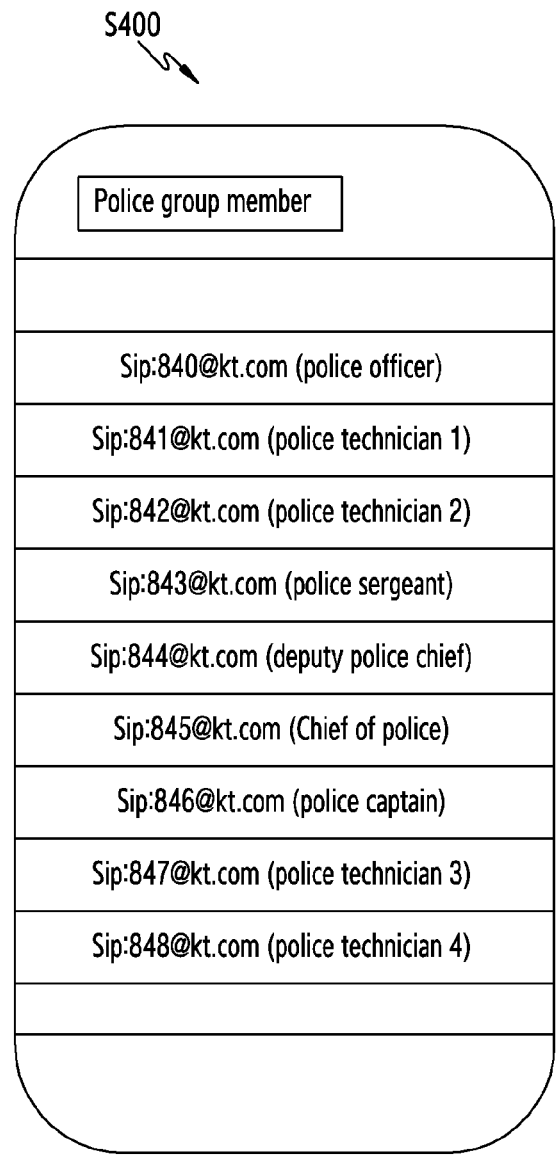
FIG. 4 illustrates an example scenario of MCX group call UI with provided conference package payload enhancements according to various embodiments of the present disclosure.

FIG. 4 illustrates an example scenario (S400) of MCX group call UI with provided conference package payload enhancements according to various embodiments of the present disclosure.

Referring to the FIG. 3, the MCX server is able to share the functional alias of group members (100a-100d) as part of SIP Conference NOTIFY. Further, the MCX server may be taken to MCX (mission critical PTT, video and data) 3GPP standards stage-3 specification. This method is also applicable to future railway mobile communication systems (FRMCS) over 5G; a successor to global system for mobile communications—railway (GSM-R).

FIG. 7 illustrates a comparison of current conference package payload and conference package payload with provided enhancement in SIP NOTIFY for 3GPP MCX.

FIG. 8 illustrates a comparison of current conference package payload and conference package payload with provided enhancement in SIP NOTIFY for 3GPP IMS.

Figure 5:
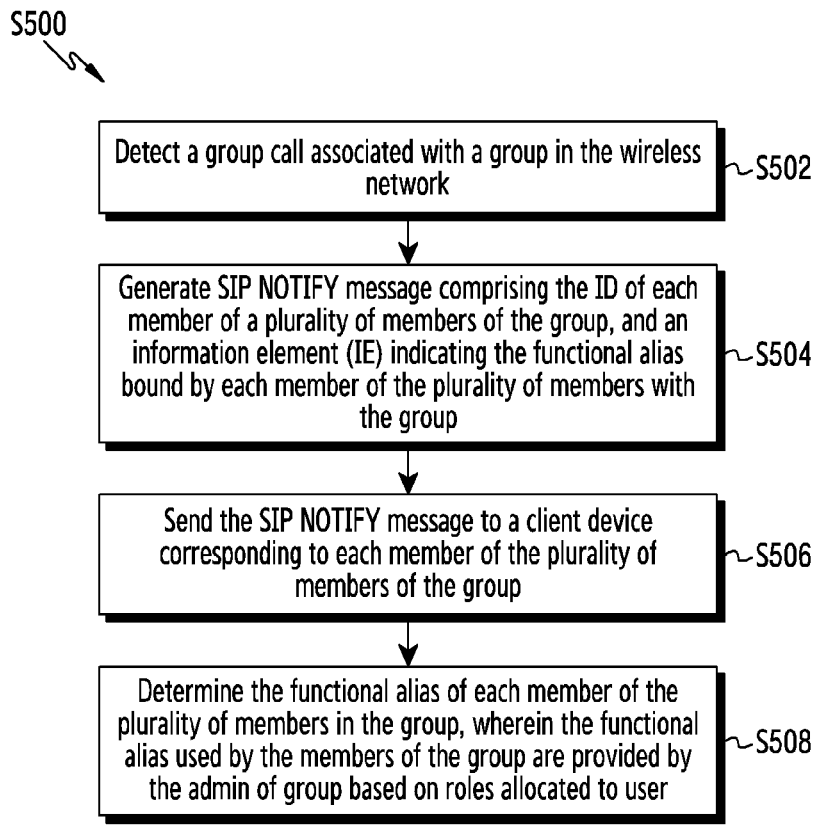
FIG. 5 illustrates a flow chart of a method, implemented by the server, for handling functional alias in the conference event package in the wireless network according to various embodiments of the present disclosure.

FIG. 5 illustrates a flow chart (S500) of a method, implemented by the server (200), for handling functional alias in the conference event package in the wireless network (1000), according to various embodiments of the present disclosure. The operations (S502-S508) are handled by the functional alias manager (240).

At S502, the method includes detecting the group call associated with the group in the wireless network. At S504, the method includes providing the SIP NOTIFY message comprising the ID of each member of a plurality of members of the group, and the IE indicating the functional alias bound by each member of the plurality of members with the group. At S506, the method includes sending the SIP NOTIFY message to the client device (100) corresponding to each member of the plurality of members of the group. At S508, the method includes determining he functional alias of each member of the plurality of members in the group, where the functional alias used by the members of the group are provided by the admin of group based on roles allocated to the user.

Figure 6:
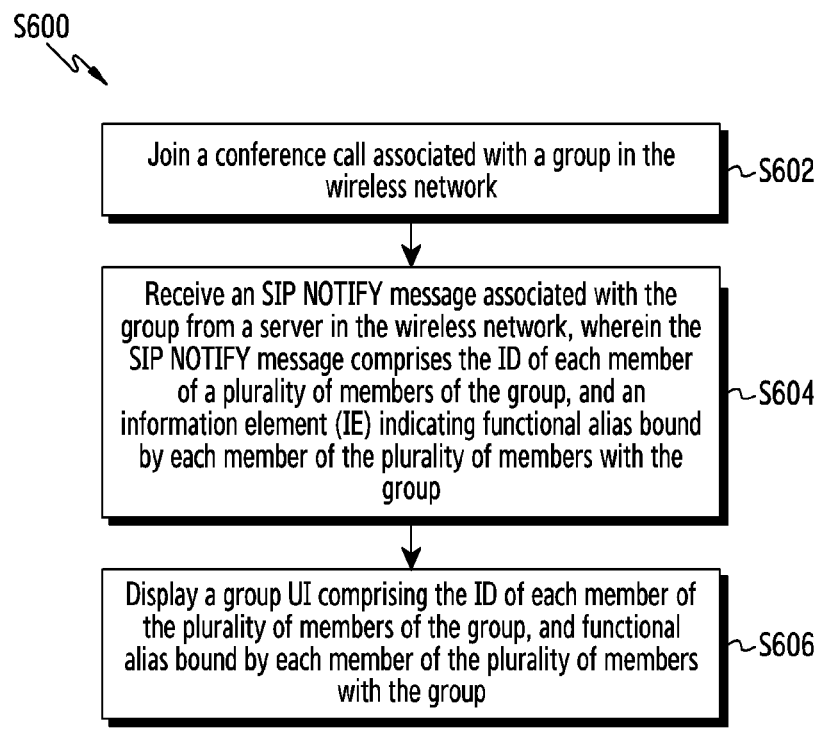
FIG. 6 illustrates a flow chart of a method, implemented by the client device, for handling functional alias in the conference event package in the wireless network according to various embodiments of the present disclosure.

FIG. 6 illustrates a flow chart (S600) of a method, implemented by the client device (100), for handling functional alias in the conference event package in the wireless network (1000), according to various embodiments of the present disclosure. The operations (S602-S606) are handled by the functional alias manager (240).

At S602, the method includes joining the conference call associated with the group in the wireless network (1000). At S604, the method includes receiving the SIP NOTIFY message associated with the group from the server (200) in the wireless network (1000). The SIP NOTIFY message includes the ID of each member of a plurality of members of the group, and the IE indicating functional alias bound by each member of the plurality of members with the group.

At S606, the method includes displaying the group UI comprising the ID of each member of the plurality of members of the group, and functional alias bound by each member of the plurality of members with the group.

The various actions, acts, blocks, steps, or the like in the flow charts (S500 and S600) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Figure 9:
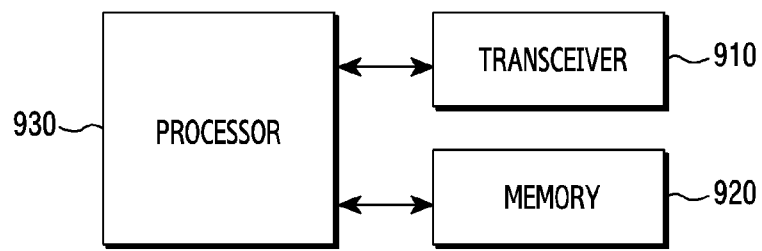
FIG. 9 illustrates the configuration of a client device in a wireless communication system according to various embodiments of the present disclosure.

FIG. 9 illustrates a structure of a client device according to various embodiments of the present disclosure.

As shown in FIG. 9, the client device according to an embodiment may include a transceiver 910, a memory 920, and a processor 930. The transceiver 910, the memory 920, and the processor 930 of the client device may operate according to a communication method of the client device described above. However, the components of the client device are not limited thereto. For example, the client device may include more or fewer components than those described above. In addition, the processor 930, the transceiver 910, and the memory 920 may be implemented as a single chip. Also, the processor 930 may include at least one processor. Furthermore, the client device of FIG. 9 corresponds to the client device of FIG. 2B.

The transceiver 910 collectively refers to a client device receiver and a client device transmitter, and may transmit/receive a signal to/from a server or a network entity. The signal transmitted or received to or from the server or a network entity may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor 930, a signal through a wireless channel, and transmit a signal output from the processor 930 through the wireless channel.

The memory 920 may store a program and data required for operations of the client device. Also, the memory 920 may store control information or data included in a signal obtained by the client device. The memory 920 may be a storage medium, such as read-only memory (ROM), random access memory (RAM), a hard disk, a CD-ROM, and a DVD, or a combination of storage media.

The processor 930 may control a series of processes such that the client device operates as described above. For example, the transceiver 910 may receive a data signal including a control signal transmitted by the server or the network entity, and the processor 930 may determine a result of receiving the control signal and the data signal transmitted by the server or the network entity.

Figure 10:
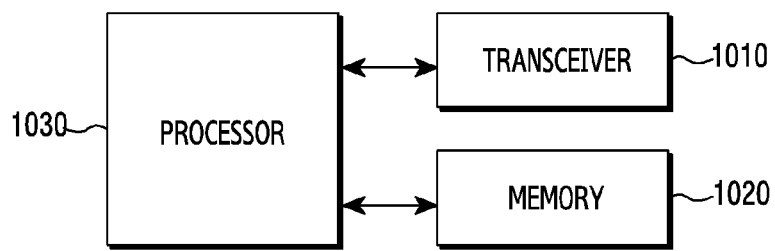
FIG. 10 illustrates the configuration of a server in a wireless communication system according to various embodiments of the present disclosure.

FIG. 10 illustrates a structure of a server according to various embodiments of the present disclosure.

As shown in FIG. 10, the server according to an embodiment may include a transceiver 1010, a memory 1020, and a processor 1030. The transceiver 1010, the memory 1020, and the processor 1030 of the server may operate according to a communication method of the server described above. However, the components of the server are not limited thereto. For example, the server may include more or fewer components than those described above. In addition, the processor 1030, the transceiver 1010, and the memory 1020 may be implemented as a single chip. Also, the processor 1030 may include at least one processor. Furthermore, the server of FIG. 10 corresponds to the server of FIG. 2C.

The transceiver 1010 collectively refers to a server receiver and a server transmitter, and may transmit/receive a signal to/from client device or a network entity. The signal transmitted or received to or from the client device or a network entity may include control information and data. The transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the server. Also, the memory 1020 may store control information or data included in a signal obtained by the server. The memory 1020 may be a storage medium, such as read-only memory (ROM), random access memory (RAM), a hard disk, a CD-ROM, and a DVD, or a combination of storage media.

The processor 1030 may control a series of processes such that the server operates as described above. For example, the transceiver 1010 may receive a data signal including a control signal transmitted by the client device, and the processor 1030 may determine a result of receiving the control signal and the data signal transmitted by the client device.

In accordance with an aspect of the disclosure, A method performed by a server in a wireless communication system is provided. The method includes identifying a group call associated with a group; generating a session initiation protocol (SIP) NOTIFY request comprising an identifier (ID) of a member of a plurality of members of the group, and an information element (IE) indicating the functional alias bound by the member of the plurality of members with the group; and transmitting the SIP NOTIFY request to a client corresponding to the member of the plurality of members of the group.

In accordance with an aspect of the disclosure, wherein the group call includes a mission critical video (MCVideo).

In accordance with an aspect of the disclosure, wherein the group call includes a mission critical push to talk (MCPTT).

In accordance with an aspect of the disclosure, wherein, in response to transmitting the SIP NOTIFY request, the ID of the member of the plurality of members of the group and the IE indicating the functional alias bound by the member of the plurality of members with the group are displayed by the client.

In accordance with an aspect of the disclosure, wherein an extension of the functional alias is used to indicate per-user functional alias association with the group, and wherein a schema of the extension the functional alias includes <xs.elemennt name-"functional-alias," type="xs:anyURI," use="optional"/>.

In accordance with an aspect of the disclosure, a method performed by a client in a wireless communication system is provided, the method includes joining a group call associated with a group, receiving a session initiation protocol (SIP) NOTIFY request comprising an identifier (ID) of a member of a plurality of members of the group, and an information element (IE) indicating the functional alias bound by the member of the plurality of members with the group.

In accordance with an aspect of the disclosure, wherein the group call includes a mission critical video (MCVideo).

In accordance with an aspect of the disclosure, wherein the group call includes a mission critical push to talk (MCPTT).

In accordance with an aspect of the disclosure, the method further includes displaying the ID of the member of the plurality of members of the group and the IE indicating the functional alias bound by the member of the plurality of members with the group.

In accordance with an aspect of the disclosure, wherein an extension of the functional alias is used to indicate per-user functional alias association with the group, and wherein a schema of the extension the functional alias includes <xs.elemennt name-"functional-alias," type="xs: anyURI," use="optional"/>.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a server in a wireless communication system, the method comprising:
   receiving, from a user equipment (UE) supporting a client, a session initiation protocol (SIP) subscribe request for a conference event package associated with an ongoing group call; and
   transmitting, to the UE, a SIP notify request including end point information based on the SIP subscribe request,
   wherein the end point information includes information on an activated functional alias of the UE,
   wherein the activated functional alias is bound to multiple groups including a group associated with the ongoing group call, and
   wherein the information on the activated functional alias corresponds to a universal resource identifier (URI).

2. The method of claim 1, wherein the client corresponds to a mission critical (MC) video client, and the server corresponds to a MC video server.

3. The method of claim 1, wherein the client corresponds to a mission critical push-to-talk (MCPTT) client, and the server corresponds to a MCPTT server.

4. A method performed by a user equipment (UE) supporting a client in a wireless communication system, the method comprising:
   transmitting, to a server, a session initiation protocol (SIP) subscribe request for a conference event package associated with an ongoing group call; and receiving, from the server, a SIP notify request including end point information based on the SIP subscribe request, wherein the end point information includes information on an activated functional alias of the UE, wherein the activated functional alias is bound to multiple groups including a group associated with the ongoing group call, and wherein the information on the activated functional alias corresponds to a universal resource identifier (URI).

5. The method of claim 4, wherein the client corresponds to a mission critical (MC) video client, and the server corresponds to a MC video server.

6. The method of claim 4, wherein the client corresponds to a mission critical push-to-] talk (MCPTT) client, and the server corresponds to a MCPTT server.

7. A server in a wireless communication system, the server comprising:

a transceiver; and a controller coupled with the transceiver and configured to:

receive, from a user equipment (UE) supporting a client, a session initiation protocol (SIP) subscribe request for a conference event package associated with an ongoing group call, and transmit, to the UE, a SIP notify request including end point information based on the SIP subscribe request, wherein the end point information includes information on an activated functional alias of the UE, wherein the activated functional alias is bound to multiple groups including a group associated with the ongoing group call, and wherein the information on the activated functional alias corresponds to a universal resource identifier (URI).

8. The server of claim 7, wherein the client corresponds to a mission critical (MC) video client, and the server corresponds to a MC video server.

9. The server of claim 7, wherein the client corresponds to a mission critical push-to-talk (MCPTT) client, and the server corresponds to a MCPTT server.

10. A user equipment (UE) supporting a client in a wireless communication system, the UE comprising:

a transceiver; and a controller coupled with the transceiver and configured to:

transmit, to a server, a session initiation protocol (SIP) subscribe request for a conference event package associated with an ongoing group call, and receive, from the server, a SIP notify request including end point information based on the SIP subscribe request, wherein the end point information includes information on an activated functional alias of the UE, wherein the activated functional alias is bound to multiple groups including a group associated with the ongoing group call, and wherein the information on the activated functional alias corresponds to a universal resource identifier (URI).

11. The UE of claim 10, wherein the client corresponds to a mission critical (MC) video client, and the server corresponds to a MC video server.

12. The UE of claim 10, wherein the client corresponds to a mission critical push-to-talk (MCPTT) client, and the server corresponds to a MCPTT server.

13. The method of claim 1, wherein the end point information further includes information on a state of a session associated with the SIP subscribe request.

14. The method of claim 4, wherein the end point information further includes information on a state of a session associated with the SIP subscribe request.

15. The server of claim 7, wherein the end point information further includes information on a state of a session associated with the SIP subscribe request.

16. The UE of claim 10, wherein the end point information further includes information on a state of a session associated with the SIP subscribe request.

* * * * *